Feb. 1, 1966 R. J. PETSCHAUER 3,233,227

PERMANENT MEMORY DATA STORAGE DEVICE

Filed Nov. 6, 1963 3 Sheets-Sheet 1

INVENTOR.

RICHARD J. PETSCHAUER

BY

Dugger Braddock Johnson & Westman

ATTORNEYS

INVENTOR.
RICHARD J. PETSCHAUER
BY
Dugger Braddock Johnson & Westman
ATTORNEYS

PERMANENT MEMORY DATA STORAGE DEVICE

Filed Nov. 6, 1963 3 Sheets-Sheet 3

INVENTOR.
RICHARD J. PETSCHAUER
BY
Dugger Braddock Johnson & Westman
ATTORNEYS 3,233,227
PERMANENT MEMORY DATA STORAGE DEVICE
Richard J. Petschauer, Minneapolis, Minn., assignor to Fabri-Tek Incorporated, Minneapolis, Minn., a corporation of Wisconsin
Filed Nov. 6, 1963, Ser. No. 321,914
10 Claims. (Cl. 340—173)

This invention has relation to a memory device into which the information to be remembered is permanently written. A memory plane of this device consists of a series of parallel drive lines which form an array of word conductors. At the location of each bit or information storage point along each word conductor, the drive line is divided to form two current paths constituted as right and left hand arcuate loops. To write information into the memory plane at a specific bit location, the continuity of one of these loops is broken leaving a clockwise or counterclockwise current path through the other loop. A current path in one direction is associated with a stored binary "one," and a current path in the other direction with a binary "zero."

When a drive current is passed through a drive line, these arcuate current paths or bit loops will generate flux lines at each bit location where information has been written or stored. Two opposite legs of a sensing loop are situated in adjacent insulated relationship to legs of both of the bit loops at each bit location. The information stored at the bit location is identified by the polarity of electrical energy induced in this sense loop as the flux lines generated in the bit loop cut the legs of the sense loop. A voltage will appear at the sense loop terminals during the rise and fall times of a current pulse through the bit loop adjacent the legs of the sense loop. The polarity of the voltage during the rise time can be taken to indicate whether a "one" or "zero" is stored.

In a specific embodiment of the invention, a memory card on which the previously described drive lines are deposited can be fed to a device such as a paper tape reader or specially adapted typewriter in order to cut away a section of one or the other of the bit loops at each bit location where information is to be stored. A card so loaded with information forms a permanent memory element from which nondestructive readout can always be obtained when associated with the aforementioned sense loops of a memory device.

When the stored information must be changed, the card can easily be removed from the device, discarded (or retained for later use) and replaced with a new card in a few seconds.

Figure 3:
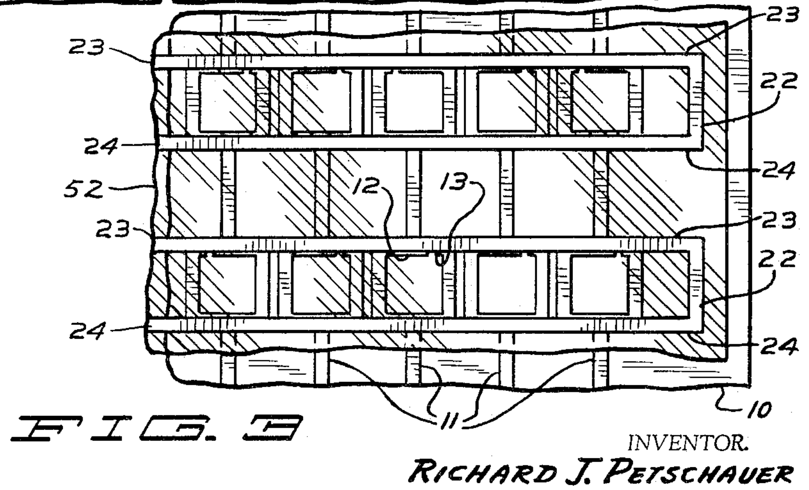
FIG. 3 is a plan view of such a card with information stored thereon and showing the relationship of the bit locations of the word drive lines to their associated sense loops.
Figure 3A:
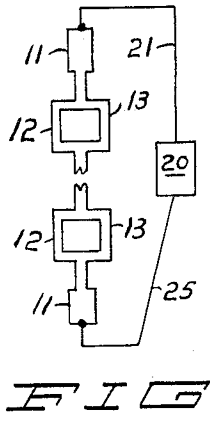
Figure 4:
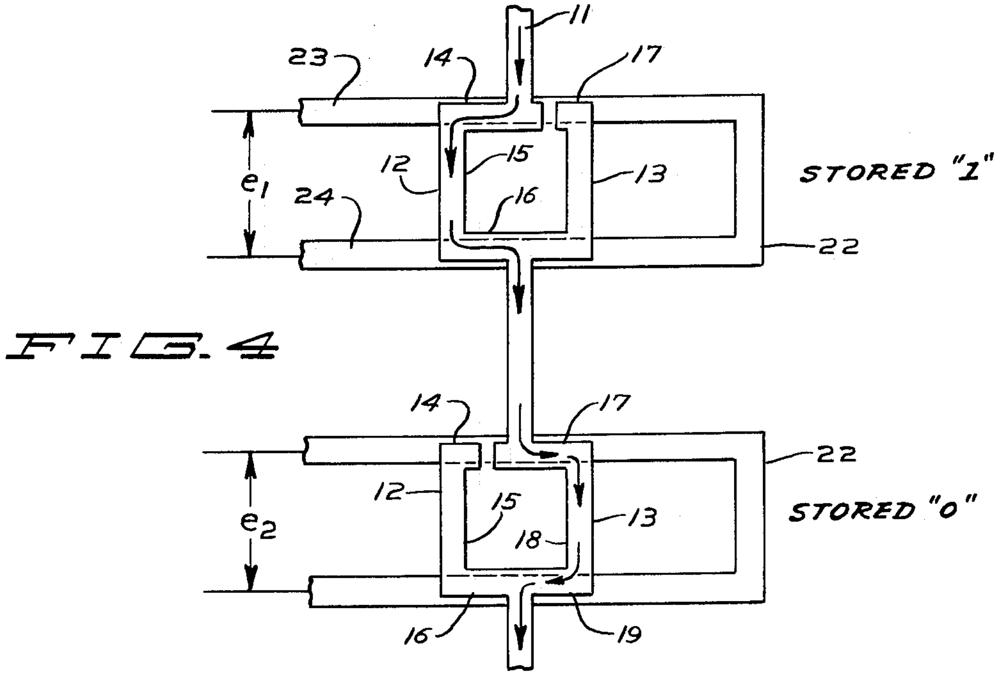
Figure 5:
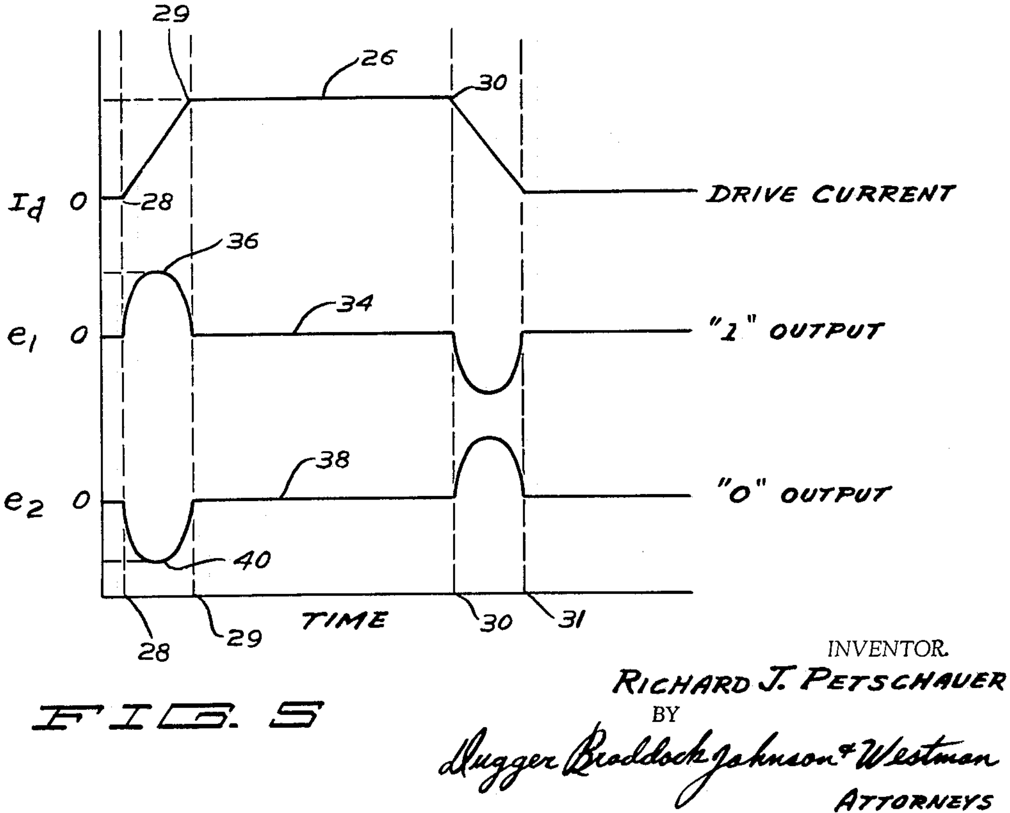
Figure 6:
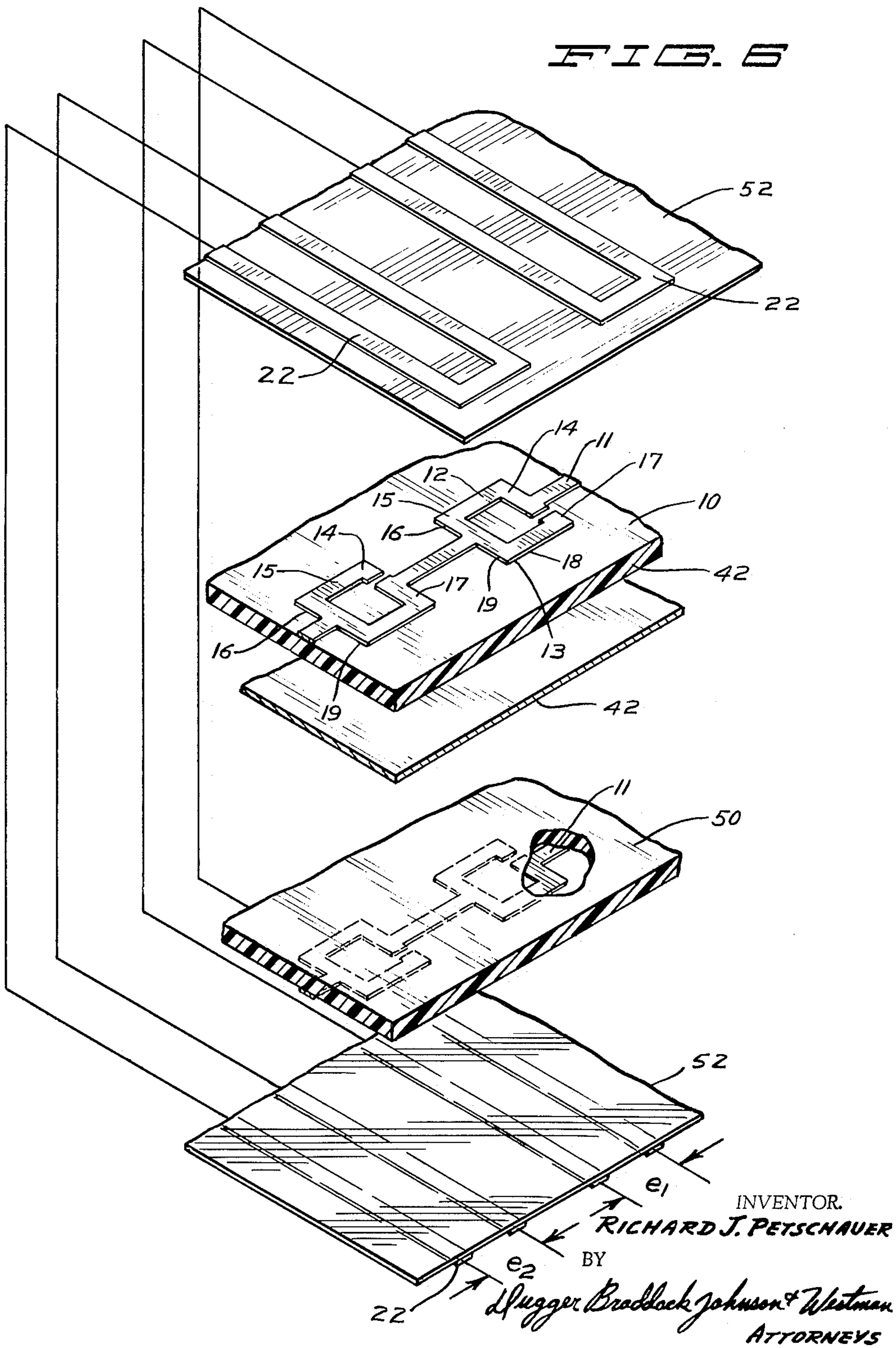

FIG. 3*a* is a plan view of a drive line showing the connection of the line to a source of input current;

FIG. 4 is an enlarged plan view of two adjacent bit locations on a single word drive line each together with its assoicated sense loop;

FIG. 5 is a graphical representation of a current pulse passing through the drive line of FIG. 4 in relationship to the voltage induced in each of the sense loops adjacent each of the bit locations as a result of such current pulse, all plotted against time; and FIG. 6 is an exploded, fragmentary, perspective view of portions of two memory cards of the present invention and portions of two of their associated sensing loops together with a common ground plate and a schematic representation of a portion of the associated electrical circuitry.

Figure 1:
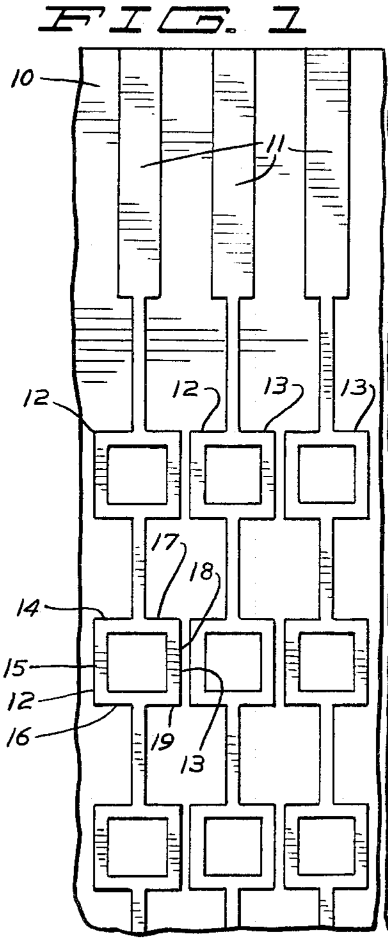
FIG. 1 is a plan view of a portion of a memory card of the present invention before information has been written thereon.

Referring to the drawings and the numerals of reference thereon, a memory card 10 has a plurality of word drive lines 11 deposited thereon. As seen in FIG. 1, when these cards are made, each of the drive lines 11 is provided with two current paths connected in electrical parallel at each of a plurality of bit locations along the word drive line. These current paths are identified as a first counterclockwise arcuate loop 12, and a second clockwise arcuate loop 13. The first loop 12, as shown, has a first leg 14 extending away from the longitudinal axis of the drive line, a connecting end leg 15 and a second leg 16 extending toward the longitudinal axis of the drive line.

The second clockwise loop 13 has a corresponding first leg 17, connecting leg 18 and a second leg 19.

When information is to be stored at a particular bit location on the memory card 10, the continuity of either the first counter-clockwise loop 12 or the second clockwise loop 13 is interrupted. One very good way of doing this is to feed the card through a mechanical device which will punch out some portion of one or the other of the loops 12 and 13 depending on whether a binary "one" or "zero" is to be stored.

Figure 2:
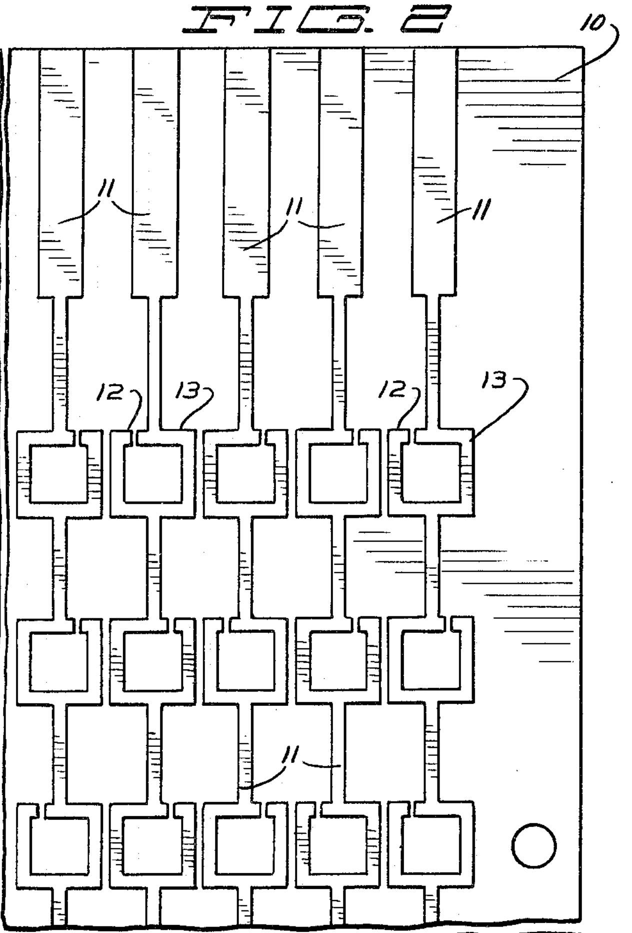
FIG. 2 is a plan view of a portion of such a card after information has been permanently written thereon.

When the desired information has been stored at every bit location, the card will appear as seen in FIG. 2. An enlarged view of two of the bits of FIG. 2 is seen in FIG. 4.

FIGURE 2*a* shows a source of input current pulses 20, connected by a pair of conductors 21 and 25 across drive line 11 containing a plurality of loops 12 and 13. When a current pulse is sent from source 20 along drive line 11 through the upper bit in FIG. 4, the current will flow only in a counterclockwise direction through the first loop 12 in that upper bit, because the continuity of the second loop 13 has been interrupted. This same current will flow only in a clockwise direction through the second loop 13 in the lower bit because the continuity of the first loop 12 has been interrupted.

As seen in FIGS. 3 and 4, a plurality of sensing loops 22 are situated to overlie an aligned set of bit locations in parallel word drive lines in such a manner that an upper leg 23 of each sensing loop lies in adjacent parallel relationship to first legs 14 and 17 of loops 12 and 13 of each bit, and a lower leg 24 of each sensing loop lies in adjacent parallel relationship to second legs 16 and 19 of said first and second loops 12 and 13 of each bit.

At the upper bit location in FIG. 4, change of rate of current flowing through the first leg 14 of the loop 12 will tend to induce a flow of electrical energy in the upper leg 23 of the upper sensing loop 22, while change of rate of flow of current in second leg 16 will tend to induce a complimentary flow of electrical energy in the lower leg 24 of this upper loop 22. The voltage thus generated across upper coil 22 is designated "$e_1$."

Similarly, change of rate of flow of electrical energy through first leg 17 of loop 13 at the lower bit location and change of rate of flow of electrical energy through the second leg 19 of this loop will tend to generate flow of electrical energy in upper leg 23 and lower leg 24 of the lower sensing loop 22 in opposite direction to that generated above, and this induced voltage is designated "$e_2$."

Referring now to FIG. 5, the flow of current through the drive line 11 of FIG. 4 is designated "$I_d$," and a pulse of current through this drive line is plotted against time as at 26. As indicated, this current builds up from its zero value at a point 28 in time, to its maximum value at point 29, and then falls away beginning at 30 to zero value at 31. As flux lines due to current increase build up between the points 28 and 29, the legs 22 and 24 of the upper and lower loops 22 are cut by those lines and voltages "$e_1$" and "$e_2$" are induced. This voltage "$e_1$" in in the upper sense loop is plotted against the same time axis as the drive current and is shown at 34. A positive voltage 36 is induced during the rise time from the point 28 to the point 29. The induced voltage "$e_2$" in the lower sense loop is similarly plotted and shown at 38. A negative voltage 40 is induced during the rise time of the current pulse.

A memory device of the present invention will sense the polarity of the voltage generated in each of the sense loops during this "rise" time of the current pulse, one of the polarities being associated with a stored binary "one" and the other polarity being associated with a stored "zero."

In a typical installation, a bit or storage element size of about 0.060″×0.070″ was used. Word conductors were spaced at ten per inch and the bit locations along the word lines were spaced at five per inch. Flux generated at one bit position caused some fringing flux to cut neighboring sense lines. With the spacing of the bits as set out above, a ground plane plate 42 of copper or the like was situated about 0.030″ away from the memory plane, and this fringing was measured to be on the order of one percent of the flux obtained with the full output. The ground plane serves to shield the sense lines from extraneous pickup and serves to absorb and cut down the incidence of fringing flux. This spacing of 0.030″ was obtained by utilizing a memory card 10 of 0.030″ thickness with the drive lines being deposited on one side and the ground plane plate 42 being situated up against the other side thereof.

As shown in the exploded view of FIG. 6, an efficient organization of the memory cards is in a back-to-back relationship to this ground plate 42. In FIG. 6, a second memory card 50 having its own drive lines 11 deposited on an under side thereof is to be situated with its back up against the ground plate 42. The sense loops 22 are shown as being deposited on a film 52 of flexible insulating material such, for example, as Mylar manufactured by DuPont. This flexible film 52 is shown as extending across the face of memory card 10 with the loops 22 on a face thereof away from the drive lines thus to space the sensing loops 22 away from the bit loops 12 and 13 by the thickness of the flexible material 52. This film 52 passes around the far edge of the memory board 10 and these same loops are positioned in adjacent spaced relationship to the bits on the under side of the memory board 50. Each of the drive lines 11 is pulsed in succession and the resulting voltage polarites read from the sense lines until the entire card 10 has been read and until the entire card 50 has been read.

While the elements are shown in spaced, exploded relationship in FIG. 6, it is to be understood that in actual use, they will be in contacting, tight, sandwich-like relationship to each other.

What is claimed is:

1. An information storage device including at least one word drive line adapted to carry electric current, input means connected to said drive line for providing an electric current thereto, and a plurality of individual information storage elements, each of said elements including a pair of interruptable current carrying loops connected in electrical parallel and connected to and along said drive line to cause the drive line current to flow through a first of said loops where the continuity of a second of said loops has been interrupted and to cause said current to flow through said second loop when the continuity of said first loop has been interrupted.

2. The combination as specified in claim 1, and means for identifying the continuous loops as current flows through each element.

3. The combination as specified in claim 2 wherein said means for identifying includes a sensing coil in electromagnetically coupled relationship to both of said loops of each of said elements.

4. An information storage device including at least one word drive line adapted to carry a pulse of electric current, means for providing an input current pulse to said drive line, and a plurality of individual information storage elements, each of said elements being constituted as a pair of interruptable current carrying loops connected in electrical parallel and connected to and along the drive line to divide the current in said drive line where both of said loops are continuous, to cause a drive line current pulse to flow in a first arcuate path where a first of said loops is continuous and a second of said loops has been interrupted and to cause a drive line current pulse to flow in a second arcuate path where said second loop is continuous and said first loop has been interrupted.

5. The combination as specified in claim 4, and means for identifying the path taken by a current pulse flowing through each element.

6. The combination as specified in claim 5 wherein said means for identifying includes a sensing coil in electromagnetically coupled relationship to both of said loops of each of said elements.

7. An information storage apparatus comprising a plurality of word drive lines adapted to carry a pulse of electric current, a source of electric current pulses connected to said drive lines, a plurality of individual information storage elements, each of said elements being constituted as a pair of interruptable arcuate current carrying element loops connected in electrical parallel and connected to and along the drive line to (1) divide the current in said drive line where both of said element loops are continuous, (2) cause a drive line current pulse to flow in a first arcuate path through a first of said element loops where a second of said element loops has been interrupted and (3) cause a drive line current pulse to flow in a second opposite arcuate path through said second element loop where said first element loop has been interrupted, and sensing loops for identifying the path taken by a current pulse flowing through each element, each of said sensing loops being in electro-magnetically coupled relationship to both element loops of an individual element associated with each of the word drive lines.

8. The combination as specified in claim 7 wherein said drive lines are situated in substantially parallel relationship to each other in a single drive line plane, said pairs of arcuate element loops lie in said drive line plane in opposed clockwise and counter-clockwise relationship to each other, each of said sensing loops extends in closely adjacent, spaced relationship to the element loops of an individual storage element of every word drive line, and a base plate of highly conductive material is situated in spaced relationship to said drive line plane.

9. An information storage assembly comprising an information storage card, a plurality of word drive lines on said card adapted to carry a pulse of electric current, means for providing input electrical current pulses to said drive lines, a plurality of individual storage elements along each of said drive lines, each of said storage elements being a part of one of said drive lines and each of said elements being constituted as a pair of interruptable, arcuate, current carrying element loops connected in electrical parallel with each other along the drive line to (1) divide the current in said drive line where both of said element loops are continuous, (2) cause the drive line current pulse to flow in a first arcuate path through a first of said element loops where a second of said element loops has been interrupted and (3) cause a drive line current pulse to flow in a second opposite arcuate path through said second element loop where said first element loop has been interrupted, an electrically insulating film overlying said word drive lines in adjacent contiguous relation thereto, and a plurality of electrically conductive sensing loops on said film at a side thereof opposite said word drive lines, each of said sensing loops beng in electro-magnetically coupled relationship to both element loops of an individual element associated with each of said word drive lines.

10. The combination as specified in claim 9, and a base plate of highly conductive material in shielding, flux line absorbing, parallel relationship to said word drive lines at a side of said card opposite said drive lines.

References Cited by the Examiner

UNITED STATES PATENTS

| | | | |
|---|---|---|---|
| 2,909,592 | 10/1959 | Morris et al. | 178—5.1 |
| 3,069,665 | 12/1962 | Bobeck | 340—174 |
| 3,130,388 | 4/1964 | Renard | 340—173 |

IRVING L. SRAGOW, *Primary Examiner.*

T. W. FEARS, *Assistant Examiner.*